United States Patent [19]

Heffron

[11] Patent Number: 4,790,698
[45] Date of Patent: Dec. 13, 1988

[54] MONOTONIC CUTTING MACHINE

[75] Inventor: Allan J. Heffron, Midland, Mich.

[73] Assignee: CM Systems, Incorporated, Midland, Mich.

[21] Appl. No.: 49,607

[22] Filed: May 13, 1987

[51] Int. Cl.$^4$ ............................................. B23C 1/00
[52] U.S. Cl. ................................. 409/200; 409/199; 51/105 SP; 51/105 EC
[58] Field of Search ...................... 82/9, 18, 2 E, 2 R; 407/12, 31, 52, 58; 29/6; 409/199 A, 200; 51/105 SP X, 105 EC

[56] References Cited

U.S. PATENT DOCUMENTS

| | | |
|---|---|---|
| 207,562 | 8/1878 | Smith . |
| 349,475 | 9/1886 | Barclay . |
| 668,195 | 2/1901 | Lange . |
| 1,365,683 | 1/1921 | Griffith . |
| 2,287,449 | 6/1942 | Price ............................ 51/105 EC |
| 2,468,745 | 5/1949 | Garand ............................. 407/12 |
| 3,271,910 | 9/1966 | Haisch ........................... 51/105 SP |
| 3,616,715 | 11/1971 | Shaumyan et al. ................... 82/2 R |
| 3,815,452 | 6/1974 | Wilhelmy ........................... 82/2 R |
| 4,015,491 | 4/1977 | Peter ................................ 82/2 R |
| 4,051,750 | 10/1977 | Berly ................................ 82/2 A |
| 4,103,588 | 8/1978 | Schmid ............................ 90/11 A |
| 4,327,612 | 5/1982 | Bazuin ............................... 82/2 R |
| 4,521,143 | 6/1985 | Schmid ............................. 409/200 |
| 4,619,565 | 10/1986 | Schmid et al. ....................... 409/135 |

Primary Examiner—Frederick R. Schmidt
Assistant Examiner—Lawrence Cruz
Attorney, Agent, or Firm—Gifford, Groh, Sheridan, Sprinkle and Dolgorukov

[57] ABSTRACT

An apparatus for machining a workpiece such as a crankshaft provides a superior combination of low initial and rebuilding costs, high flexibility in tool changeover and alteration of configuration, yet minimizes floor space and noise level while allowing the combining of several machine operations in a single step. The apparatus also permits the use of optimum cutting speeds, cutting tool feeds, cutting tool composition and cutting tool dimensional tolerances. The apparatus includes a lathe bed to which the crankshaft is mounted and rotated at a variable rate of speed, as well as an arbor disposed parallel to the axis of rotation of the workpiece, rotatable in the same direction at a variable speed. At least one cutter disk is fixedly mounted to the arbor. The disk has a plurality of cutting tools disposed about part but not all of its circumfery, the tools being located at a generally increasing distance from the center of the disk in a stepwise fashion. The circumfery of the disk also includes a second cutout portion between the radially outermost and radially innermost tools. The disk is rotated to bring first the outermost and then the sequentially more inner tools into contact with the spinning workpiece, in order to machine it. The workpiece and disk are each rotated at programmed, varying rates in order to optimally match the tool feed rate and the workpiece surface linear speed for each machining operation, for example, rough cutting, finish cutting, and dimensioning.

12 Claims, 2 Drawing Sheets

MONOTONIC CUTTING MACHINE

BACKGROUND OF THE INVENTION

I. Field of the Invention

The present invention relates to devices for machining parts, and more particularly to an apparatus for machining main bearings, crankpins, flanges, cheeks and the like of the crankshaft of an internal combustion engine, or machining any part having a round outside diameter on face.

II. Description of the Prior Art

The crankshaft is a well known element of a reciprocating piston engine or compressor. The crankshaft includes a plurality of main bearings on whose centers the crankshaft rotates, and a plurality of crankpins offset from the axis of the crankshaft. The pistons of the engine are connected to the crankpins by a plurality of connecting rods. The crankshaft thus changes the linear motion of the pistons to rotational motion, which is then transmitted to a drive means, transmission or the like.

Due to the high rotational speed and stresses encountered during operation, the crankshaft is forged metal (typically steel or ductile iron) for strength, and it is critical that the crankshaft be machined with great precision. The elements to be machined include the counterweight faces (cheeks) and diameters; the main bearing and crankpin bearing faces (sidewalls and thrust walls), diameters and undercuts; and other faces and diameters such as gear fits, oil seals, pulley fits, slingers, flanges, gears and reluctors.

Several methods are known for machining crankshafts from rough forgings or castings. However, each of the known methods has a number of associated drawbacks. Machining of the crankshafts by turning allows little flexibility for tooling changeover, requires frequent tool change and other maintenance, has poor swarf control and entails a high sound level in the shop. In contrast, machining by skiving (and/or turn broaching) has a high initial and rebuilding cost, requires a good deal of floor space, has no steady rest capability, and has little flexibility in machine configuration. Milling has also been employed for machining crankshafts, but does not readily allow the combining of several operations on the workpiece at the same location, and at the same time entails relatively expensive maintenance, is not useful for a number of crankshaft operations, requires special premachining of the crankshaft, and also has a relatively high initial and rebuilding cost. A last known method, grinding, is not often used to machine crankshafts because of high initial and rebuilding costs, low production capability, a high cost in perishable tools, significant tool change downtime, an inability to combine several operations, and an inability to achieve optimal cutting speeds, feed rates and tool dimensional tolerances. The relatively high cost of machining crankshafts is a significant factor in the cost of manufacturing an engine, and therefore in manufacturing a motor vehicle. Indeed, one major cost and inefficiency in prior methods of manufacture has been the need to withdraw or reciprocate the machining edge, tool or implement from the area of the workpiece, before positioning and working a new workpiece.

SUMMARY OF THE PRESENT INVENTION

The present invention overcomes these and other drawbacks in the prior devices by providing an apparatus for machining a workpiece or part having a round outside diameter or face, such as a crankshaft, which provides superior combination of low initial and rebuilding cost, and high flexibility in tool changeover and alteration of configuration, while minimizing floor space and noise level. The apparatus of the present invention also combines several machine operations into a single step, and permits the use of optimum cutting speeds, cutting tool feed rates, cutter composition and cutting tool dimensional tolerances.

The apparatus of the present invention comprises a lathe bed and means rotatably mounting the workpiece, preferably a forged, precentered crankshaft, to the bed. The apparatus also includes an arbor disposed parallel to the axis of rotation of the workpiece, rotatable in the same direction as the direction of rotation of the workpiece. At least one substantially planar disk is fixedly mounted on the arbor and rotatable in unison with it. The disk has a plurality of cutting tools disposed about part of its circumfery, the tools being located at a generally increasing distance from the center of the disk in a stepwise fashion. The circumfery of the disk also includes a second cutout portion between the radially outermost and innermost tools.

In operation, the disk is rotated to bring first the radially innermost tools and then the sequentially more outer tools, into contact with the same location on the rotating workpiece, in order to machine it. The workpiece and disk are each rotated at programmed, variable rates, in order to optimally match the cutting tool fed rate and the workpiece surface linear speed for each of the tools or groups of tools, for example, rough cutting, finish cutting, or dimensioning tools, depending upon the operations to be performed.

Once the radially outermost tool has cut the workpiece, the cutout portion of the disk circumfery provides sufficient space for the ready removal of the workpiece from the lathe bed without the need to shift the disk and its associated cutting tools out of the way, or recycle it back to an initial, disengaged position. The workpiece is simply rotated to its initial position in a direct fashion. Thus, in addition to the previously mentioned advantages, the present invention avoids the tool slides or reciprocating carriers, and their associated wear, poor dimensional tolerances, and extra mechanisms, encountered in prior art broaching tools and the like.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
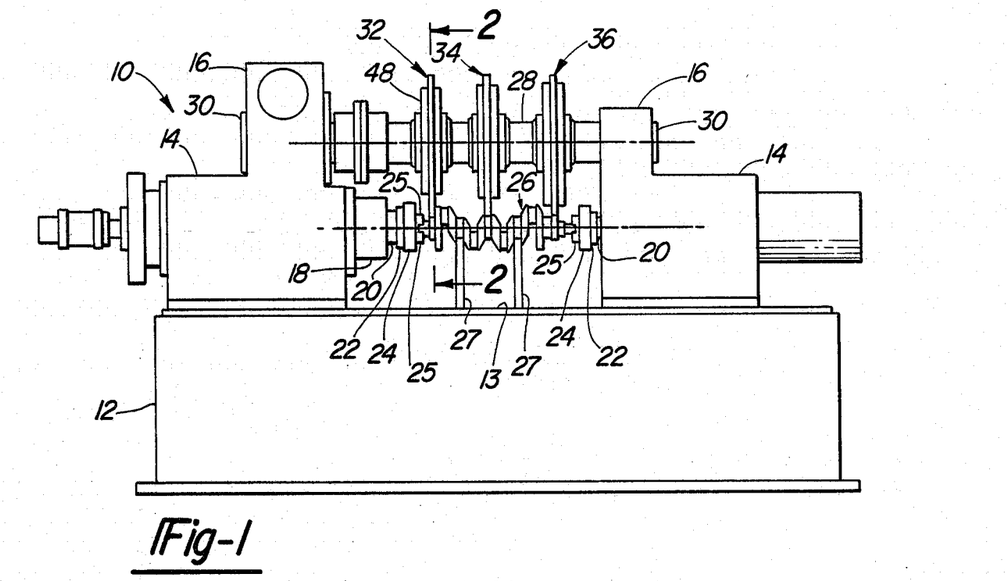
FIG. 1 is a front elevational view of the preferred embodiment of the present invention for a typical main bearing application.

With reference now to FIG. 1, the machining apparatus 10 of the present invention is thereshown first comprising a unitary outer casing 12. A lip 13 located about the perimeter of the casing 12 directs stray machining coolant or lubricant back to a swarf removal opening (not shown), discharged to a conventional chip disposal apparatus. The casing 12 includes a pair of spindle housings 14 made of reinforced, heavy walled, fine grain cast iron, mounted to the casing 12 with cross keys to maintain alignment therewith. A pair of arbor housings 16 are formed integrally with the spindle housings 14, and are similarly made of fine grained cast iron.

A lathe bed for turning a workpiece to be machined is formed from a spaced pair of bearings 18 contained in the spindle housings 14 (only one bearing 18 being shown) and a pair of spindle quills 20 retractably mounted in each of the bearings 18. The quills 20 each bear a spindle 22 thereon, centerable upon a workpiece 26 gripped and contained between the spindles 22 by a chuck 24 on the end of each of the spindles 22. The chucks 24 are hydraulically actuated, as is retraction of the quills 20, so that the workpiece 26 is readily mounted to and detached from the lathe bed. The chucks 24 each include a plurality of jaws 25 for gripping and dogging the workpiece 26. A tool arbor 28 is mounted to the arbor housings 16 by a pair of antifriction bearings 30 contained in the arbor housings 16.

The apparatus 10 of the present invention can preferably include a pair of steadyrests 27 engageable with a pair of journal surfaces 29 previously machined on the workpiece 26. Additionally, or alternatively, although not shown the apparatus 10 can include one or more conventional devices for manipulating the workpiece 26, such as a loader, transfer, bridge or other mechanism for moving the workpiece 26 with respect to the latched bed.

Each of the spindles 22 and the arbor 28 rotate in the same direction, that is, each in a clockwise or counterclockwise direction, when viewed from the same end. Each spindle 22 is driven by a parallel set of precision helical gears (not shown) by a controlled frequency AC motor or other conventional motor through a sheave, V-belt and air brake arrangement. The workpiece 26 is thus driven on both of its ends. The arbor 28 is driven by another controlled frequency AC motor or other conventional motor through a heavy duty compound worm gear and snubber arrangement (not shown), the latter for the purpose of preventing overrotation of the arbor 28. The drive connection between the means for driving the spindles 22 and the arbor 28 is characterized in being adapted to drive the spindles 22 and arbor 28 at different, variable rotation rates.

The arbor 28 preferably comprises a 250 millimeter diameter steel tube having a wall thickness of 50 millimeters. The outside diameter of the arbor 28 is ground and serves as the base for one or more rotatable cutter bodies attached to it. The cutter bodies preferably comprise a plurality of disks, such as the disks 32, 34 and 36 shown in FIG. 1. Rotation of the arbor 28 rotates the cutter bodies with respect to the workpiece 26, thereby performing machining operations upon it. The workpiece 26 is rotated at a speed greater than the rotational speed of the arbor 28, while one rotation of the arbor 28 is all that is necessary to complete the machining of the workpiece 26 performed by the apparatus 10.

Figure 2:
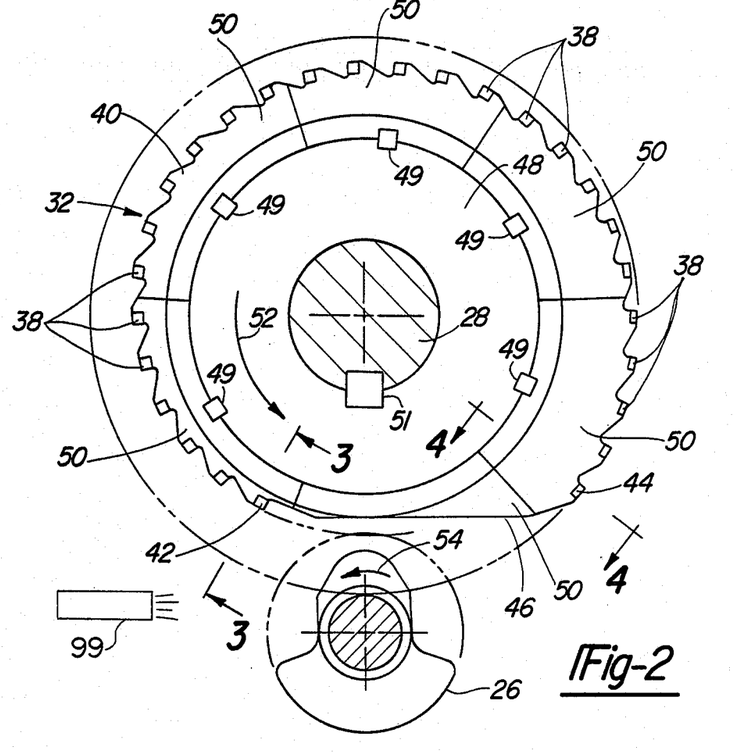
FIG. 2 is a cross-sectional view taken along line 2—2 of FIG. 1.

With reference now to FIGS. 1 and 2, the structure of the cutting bodies is more particularly exemplified by the disk 32. A plurality of cutting tools 38 are disposed about the circumfery 40 of the disk 32, increasing in radial distance from the center of the disk 32 from a radially innermost cutting tool 42 to a radially outermost cutting tool 44. The circumfery 40 of the disk 32 also includes a cutout portion 46 bearing no cutting tools thereon, but instead providing a clearance space for the free passage of the workpiece 26 with respect to the disk 32. The disk 32 is formed from a plurality of disk segments 50 rigidly but detachably mounted to a disk hub 48. The position of the segments 50 with respect to the hub 48 are precisely maintained by engagement of a hub key 49 with the hub 48 and each of the segments 50. The hub 48 is similarly rigidly but detachably affixed to the arbor 28, and maintained in a precise position by an arbor key 51 engaging the arbor 28 and the hub 48.

In operation, the workpiece 26 rotates in, for example, a counterclockwise direction as indicated by the arrow 54. The disk 32 rotates in the same direction, for example, the counterclockwise direction, as indicated by the arrow 52. Rotation of the disk 32 thus brings first the radially innermost cutting tool 42 into engagement with the workpiece 26, and the other tools 38 sequentially into engagement with the workpiece 26, until the workpiece is finally engaged and machined by the radially outermost tool 44.

Figure 3:
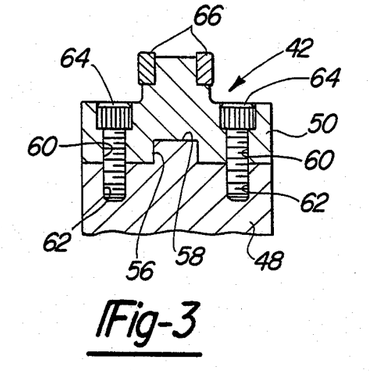
FIG. 3 is a cross-sectional view taken along line 3—3 of FIG. 2.

With reference now to FIG. 3, one method of attaching the segments 50 to the hub 48 is more particularly shown. Each disk segment 50 includes an annular recess formed on the radially inner surface of the segment 50, which receives therein an annular projection 58 formed on the radially outer surface of the hub 48. Additionally, each of the segments 50 additionally includes at least a pair of apertures 60 formed therethrough in registry with a matching pair of threaded bores 62 formed in the hub 48, one on either side of the projection 58. A screw 64 is disposed through each aperture 60 and is engaged in each of the bores 62, so as to rigidly yet detachably secure each segment 50 to the hub 48.

Figure 4:
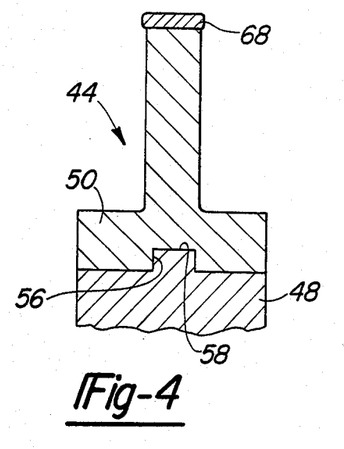
FIG. 4 is a cross-sectional view taken along line 4—4 of FIG. 2.

With reference now to FIGS. 3 and 4, two of the diverse plurality of tool bits useful in the present invention are shown. Preferably, the tools 38 are arranged around the circumfery 40 of the disk 32 such that utility grade tool bits, such as a pair of bits 66 on the tool 42, are employed on the more radially inner tools 38, while precision grade tools bits such as a bit 68 on the tool 44 are employed on the more radially outer tools 38. This permits utility grade tool bits to be employed for roughing cuts and the like, that is, the less precise machining steps, while precision grade tool bits are employed for finished diameter cuts, burnishing and the like. The utility grade bits 66 and the precision grade bits 68 are attached to the respective disk segments 50 in any conventional fashion, for example, by screws or clamps (not shown).

The apparatus 10 of the present invention is particularly useful for the machining of the crankshaft of an internal combustion engine. Such a crankshaft is generally shown in FIG. 1, but its elements are of the arrangement more particularly shown in FIGS. 5 or 6. By way of example, a crankshaft 70 for a four cylinder automobile engine includes a coaxial plurality of main bearings 72 separating two pairs 74 and 76 of coaxial crankpins. The crankpins 74 and 76 are connected to the main bearings 72 by a plurality of arms 78. The arms 78 also connect a plurality of counterweights 80 to the main bearings 72, opposite the crankpins 74 and 76. During the machining operation, the diameters of the main bearings 72 and crankpins 74 and 76 must be machined to the appropriate diameters, rough ground and/or finish ground. Additionally, the faces of the counterweights 80 as well as the faces of the flanges must be sized to ensure that they do not interfere with rotation of the cranks upon the crankpins 74 and 76 during operation of the engine. Further, it is desirable to form a pair of webs 84 on each of the crankpins 76, at least on their radially outermost surface. Undercutting of the various members of the crankshaft 70 is also desirable.

The crankshaft 70 includes a first end 86 having a post formed thereon, and a flange or second end 88 having a flange formed thereon. It is preferred that each end 86 and 88 of the crankshaft 70 has been previously centered, that is, a conical recess has been sunk into the end for establishing a centerline for rotation, machining and repair, and additionally includes a pair of reference diameters 90 and 92 machined thereon, respectively. While the reference diameters 90 and 92 can be machined according to the present invention, it is preferred that such diameters be provided on the crankshaft 70 prior to machining by the apparatus 10 of the present invention. For machining performed while the crankshaft 70 is rotated about the axis of the main bearings 72, the chucks 24 grip the diameters 90 and 92, by abutment of the jaws 25 thereagainst.

With reference again to FIG. 1, operation of the apparatus 10 of the present invention for machining the crankshaft 70 can now be readily understood. As disclosed, the apparatus 10 preferably incorporates three cutting disks 32, 34 and 36, corresponding one each to two of the main bearings 72 and the oil seal diameter 73 of the crankshaft 70. Initially, the quills 20 are retracted into the spindle housings 14 so as to allow the steadyrest 27 to support and position the crankshaft 70, the particular workpiece 26 being machined, between the spindle 22. The quills 20 are then actuated to bring the spindles 22 into abutment with the crankshaft 70, and the chucks 24 actuated to clamp the diameters 90 and 92 on the post end 86 and flange end 88 of the crankshaft 70. In this rest position, the cutout portions 46 of the circumfery 40 of the disk 32, as well as of the disks 34 and 36, are disposed adjacent the crankshaft 70. The crankshaft 70 is then rotated in the direction of the arrow 54 by the spindles 22 and the quills 20. Typically, while varied during operation, the rotational speed of the crankshaft 70 will be about 1000 rpm. Once the crankshaft 70 is up to speed, the arbor 28 is rotated in order to bring the cutting tools 38 on the circumfery of each of the disks 32, 34 and 36 into engagement with the surface of the crankshaft 70, specifically, at each of the two main bearings 72 and oil seal diameter 73. The tools 38 on each of the disks 32, 34 and 36 are staggered so that only the tools 38 on one of the disks 32, 34 and 36 engage the crankshaft 70 at any given moment.

The arbor 28 is rotated (again, preferably at a variable speed) so that first the radially innermost tool 42 on each of the disks 32, 34 and 36 engages the spinning crankshaft 70, followed by engagement of the radially more outward tools 38 on each of the disks 32, 34 and 36, until the workpiece is finally engaged by the radially outermost tool 44 on each of the disks 32, 34 and 36. Additionally, in their travel toward the main bearings 72, the tools 38 will also machine (cheek) the faces of the adjacent arms 78 and counterweights 80.

When the arbor has rotated to a position where the cutout portion 46 of each of the disks 32, 34 and 36 are adjacent the crankshaft 70, rotation of the arbor 28 and crankshaft 70 are ceased. The chucks 24 are then actuated to disengage from the crankshaft 70, and the quills 20 retracted so as to withdraw the spindles 22 and the chucks 24 from the crankshaft 70. The support 27 is then actuated to remove the crankshaft 70 from the lathe bed, and replace it with a new workpiece to be machined. The arbor 28 is not rotated backwards or transversely withdrawn after cutting, but is instead maintained in position, the cutout portion 46 of each disk 32, 34 and 36 precluding interference with the loading and unloading of the crankshaft 70. The disks 32, 34 and 36 are thus in position to machine a new crankshaft 70 without being rotated in the reverse direction.

It is an advantage of the present invention, and it is preferred, that several different machining operations are performed during a single rotation of the arbor 28. For example, with respect to the main bearings 72, the machining operations performed by the sequential plurality of tools 38 can include rough cutting, rough undercutting, rough diameter turning, semi-finish undercutting, further rough diameter turning, finish undercutting and finish diameter cutting, as well as the cheeking mentioned earlier.

Figures 5, 6:
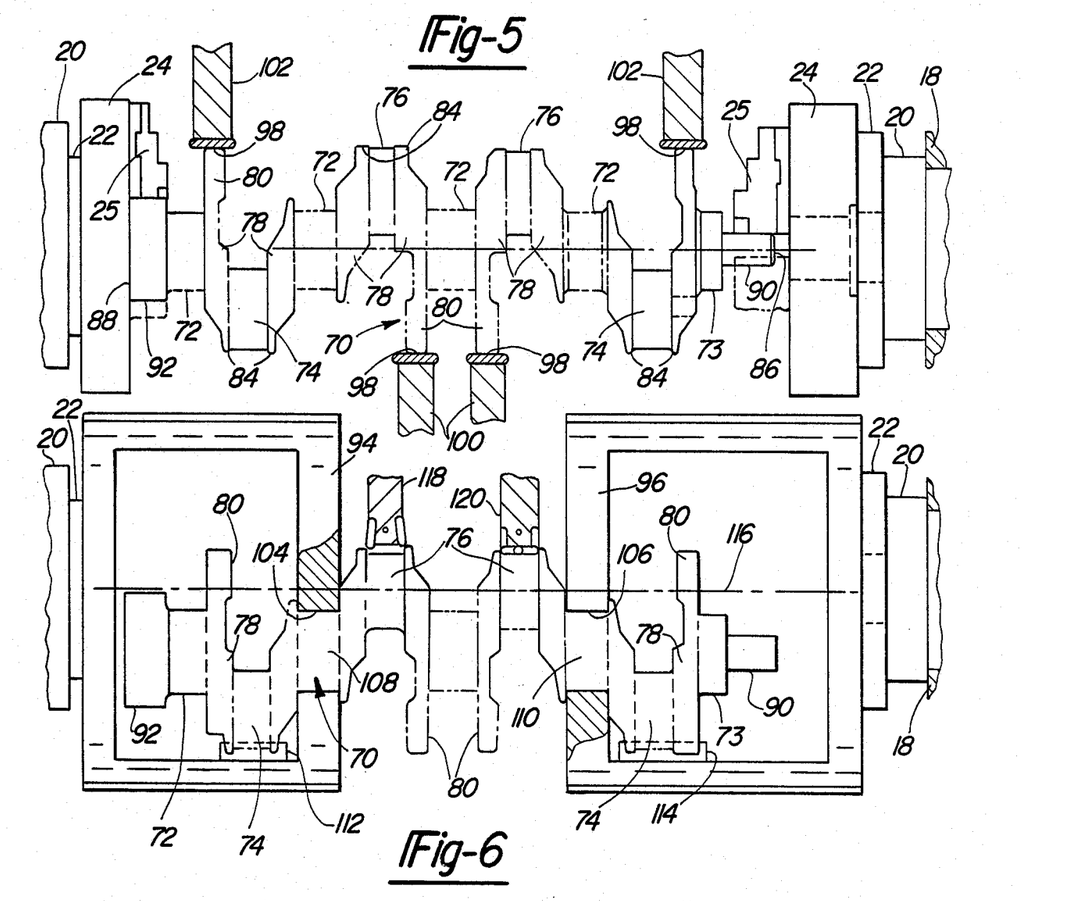
FIG. 5 is a partial top view of the preferred embodiment of the present invention similar to FIG. 1 except depicting a double end drive machine operating on the counterweight edges.
FIG. 6 is a partial side view of another preferred embodiment of the present invention depicting a double end drive machine operating on nos. 2 and 3 crankpins.

The apparatus 10 of the present invention can be used to perform various other machining operations. For example, with particular reference to FIG. 5, the preferred embodiment shown therein can be used to machine the radially outermost edges 98 of the counterweights 80. The crankshaft 70 is checked on its end diameter 90 and 92 and rotated so as to present the edges 98 of the counterweights 80 for machining by two staggered pairs of rotatable cutting disks 100 and 102. For clarity, the disks 100 and 102 are shown in FIG. 5 as if they are mounted to different arbors, to show their engagement with all four counterweight edges 98. If the disks 100 and 102 are all mounted to the same arbor, then they would of course be located on the same side of the crankshaft 70; the disks 100, for example, would then be in a position diametrically opposed across the crankshaft 70 as compared to their position shown in FIG. 5.

With reference now to FIG. 6, another preferred embodiment of the present invention is thereshown which is useful for machining the crankpins 74 or 76 themselves, as well as the adjacent faces of the counterweights 80 and flanges 78. The chucks 24 of the apparatus 10 are replaced by a pair of pot chucks 94 and 96 centered on the spindles 22. The pot chucks 94 and 96 each include a radially offset partial slot 104 or 106, respectively, the slots 104 and 106 being disposed parallel to one another. The slots 104 and 106 have rounded bottoms (not shown) and are dimensioned to slidably receive coaxial diameters or bearings on the crankshaft 70, such as the nos. 2 and 4 main bearings 108 and 110, respectively. A pair of stops 112 and 114 on the pot chucks 94 and 96 abut the outer surface of the crankshaft 70 and prevent rotation of the crankshaft 70 relative to the chucks 94 and 96, that is, rotation in the bottom of the slots 104 and 106, when the crankshaft 70 is rotated during machining. The slots 104 and 106 are dimensioned, either by being offset a sufficient distance from the axis of rotation 116 of the spindles 22, or by possessing a length and angle with respect to the centers of the chucks 94 and 96, so that one set of crankpins 74 or 76 (the latter, in FIG. 6) is coaxially disposed on the spindle axis 116. The crankpins 76 are then rotated and machined in the same manner as the main bearings 72, by a pair of cutter disks 118 and 120. The other pair of crankpins 74 can be machined in a similar fashion, gripped in pot chucks (not shown) which are mirror-image reversals of the pot chucks 94 and 96. Of course, in practice, the apparatus 10 of this preferred embodiment of the invention crankshafts into and out of engagement with the slots 104 and 106 on the pot chucks 94 and 96.

Several features characterize each of these embodiments of the present invention. The rotational rates of each of the crankshaft 70 (or other workpiece 16) and the arbor 28 are varied with respect to one another so as to optimize the match of the feed rate of the tools 38 and the linear surface speed of the portion of the crankshaft 70 being machined, in dependence upon the type of cutting or machining performed by each individual tool 38. In the machining operations described above, upwards of a dozen different types of cutting tools can be employed on each disks, to provide as complete a treatment as possible of the machined portions of the crankshaft 70. It is also preferred in the present invention that, insofar as practicable, the tools 38 includes indexable carbide tool bits of standard, interchangeable configuration. For example, it is preferred that sidewall and diameter finishing tools are mounted in adjustable preset cartridges. In this manner, tool inserts or bits can be readily changed while the arbor and cutters remain intact on the machine, in contrast to the extensive downtime necessary in the prior art for replacement of the machine tooling.

It has also been found advantageous to employ means 99 (FIG. 2) for applying a coolant or lubricating material in conjunction with the apparatus 10 of the present invention, although generally more for the purpose of swarf control than for cooling or lubrication. It is preferred that the apparatus include means for controlling the temperature of the cutting disks and associated machinery, rather than employing a coolant, or mechanical temperature compensation, for control of the dimensional tolerances of the assembled machine.

The apparatus of the present invention possesses numerous advantages over the machining devices of the prior art. One significant advantage is a reduction in ambient noise, as a result of the absence of the heavy intermittent plunge cut encountered during use of conventional broaching, milling or turning machines. The apparatus of the present invention combines several machining operations into a single operation, reducing the time, energy and equipment necessary to complete the machining operation. The absence of any slide from a conventional broaching tool permits higher dimensional tolerances to be achieved, as compared to conventional machining devices. Most particularly, the apparatus permits a careful matching of the feed rate of the individual tools (by variably controlling the rotation rate of the arbor) with the linear surface speed of the workpiece being machined (also variable, and directly independent upon the rotational speed of the workpiece). Many other advantages exist as well.

Having described my invention, however, many modifications thereto will become apparent to those skilled in the art to which it pertains, without deviation from the spirit of the present invention, as defined by the scope of the appended claims.

I claim:

1. An apparatus for machining a workpiece, said workpiece having a centerline, said apparatus comprising:
   a lathe bed;
   means for detachably mounting said workpiece to said lathe bed with said workpiece centerline disposed in a predetermined direction;
   means for rotating said workpiece around said centerline in a first rotational direction and at a first rotational speed;
   an arbor having a longitudinal axis spaced from and parallel to said workpiece centerline;
   means for rotating said arbor about said longitudinal axis in a second rotational direction and at a second rotational speed, said second rotational direction being the same as said first rotational direction;
   a planar disk perpendicularly mounted to said arbor and being rotatable therewith so as to define a disk center; and
   a sequential plurality of tools attached to the circumfery of said disk at circumferentially spaced positions therealong, said teeth increasing in radial spacing from said disk center from one angular position and to a second angular position on said disk, wherein said disk rotates a single revolution per machining operation,
   wherein said first rotational speed is substantially greater than said second rotational speed so that rotation of said workpiece against said tools removes material from said workpiece.

2. The invention as defined in claim 1 wherein said means for rotating said arbor comprises means for rotating said arbor at a variable rotational speed during a single machining operation.

3. The invention according to claim 1, wherein said means for detachably mounting said workpiece to said bed comprises a chuck attached to said bed, receiving a part of said workpiece therein.

4. The invention according to claim 2, wherein said apparatus further comprises means coordinating said workpiece rotating means and said variable arbor rotating means so as to match the feed rate of said tools on said disk and the linear surface velocity of said workpiece where engaged by said tools.

5. The invention according to claim 4, wherein during rotation of said disk, the rate of rotation of said disk is set by said coordinating means to at least two different values.

6. The invention according to claim 1, wherein said apparatus additionally comprises a unitary outer casing; and wherein said means for rotating said workpiece comprises a pair of spindle housings mounted to said casing, a pair of work spindles engageable with said workpiece, and a pair of retractable quills contained one each in said spindle housings, to which said work spindles are connected.

7. The invention according to claim 6, wherein said quills are mounted to said spindle housings by antifriction bearings.

8. The invention according to claim 1, wherein said apparatus comprises at least one additional disk having an associated plurality of tools disposed on its circumfery, and means for rotating said additional disk in the same direction as said first-mentioned disk.

9. The invention according to claim 8, wherein said at least one additional disk is mounted to said arbor.

10. The invention according to claim 6, wherein said apparatus additionally comprises a pair of arbor housings integrally formed with said spindle housings, and a pair of antifriction bearings disposed one each in said arbor housing, mounting said arbor to said casing.

11. The invention according to claim 1, wherein said apparatus additionally comprises means for applying at least one of a lubricant and a coolant to said tools and said workpiece.

12. The invention according to claim 1, wherein said workpiece axis and said longitudinal arbor axis are fixed with respect to each other

* * * * *

REEXAMINATION CERTIFICATE (1963rd)
United States Patent [19]

Heffron

[11] B1 4,790,698
[45] Certificate Issued  Mar. 30, 1993

[54] MONOTONIC CUTTING MACHINE

[75] Inventor: Allan J. Heffron, Midland, Mich.

[73] Assignee: Ingersoll CM Systems, Incorporated, Midland, Mich.

Reexamination Request:
No. 90/002,258, Jan. 23, 1991

Reexamination Certificate for:
Patent No.: 4,790,698
Issued: Dec. 13, 1988
Appl. No.: 49,607
Filed: May 13, 1987

[51] Int. Cl.$^5$ .............................. B23C 1/00
[52] U.S. Cl. .................. 409/200; 409/199; 51/105 SP; 51/105 EC
[58] Field of Search ............ 82/9, 18, 2 E, 2 R; 407/12, 31, 52, 58; 29/6; 409/199, 200; 51/105 SP, 105 EC

[56] References Cited
U.S. PATENT DOCUMENTS

| | | |
|---|---|---|
| 207,562 | 8/1878 | Smith . |
| 349,475 | 9/1886 | Barclay . |
| 668,195 | 2/1901 | Lange . |
| 1,365,683 | 1/1921 | Griffith . |
| 1,899,608 | 2/1933 | Bullard . |
| 2,044,494 | 6/1936 | Bullard . |
| 2,044,495 | 6/1936 | Bullard . |
| 2,090,119 | 8/1937 | Groene et al. . |
| 2,186,417 | 1/1940 | Kraus . |
| 2,267,182 | 12/1941 | Wildhaber . |
| 2,287,449 | 6/1942 | Price ................ 51/105 EC |
| 2,407,921 | 9/1946 | Deliso . |
| 2,468,745 | 5/1949 | Garand ................. 407/12 |
| 2,553,966 | 5/1951 | Groene . |
| 2,620,709 | 12/1952 | Wildhaber et al. . |
| 3,271,910 | 9/1966 | Haisch ............... 51/105 SP |
| 3,616,715 | 11/1971 | Shaumyan et al. ........ 82/2 R |
| 3,815,452 | 6/1974 | Wilhelmy ................. 82/2 R |
| 3,818,562 | 6/1974 | Lacey . |
| 4,015,491 | 4/1977 | Peter .................... 82/2 R |
| 4,051,750 | 10/1977 | Berly .................... 82/2 A |
| 4,103,588 | 8/1978 | Schmid .................. 90/11 A |
| 4,327,612 | 5/1982 | Bazuin ................... 82/2 R |
| 4,464,086 | 8/1984 | Bentjens . |
| 4,521,143 | 6/1985 | Schmid .................. 409/200 |
| 4,619,565 | 10/1986 | Schmid et al. .......... 409/135 |
| 4,789,273 | 12/1988 | Wiacek et al. . |
| 4,799,839 | 1/1989 | Berstein et al. . |
| 4,801,226 | 1/1989 | Gleason . |

FOREIGN PATENT DOCUMENTS

3525514A1  1/1987  Fed. Rep. of Germany .

OTHER PUBLICATIONS

Firm Heinlein, Turning Broach, Sep. 1985, 2 pages total.

*Primary Examiner*—Bruce M. Kisliuk

[57] ABSTRACT

An apparatus for machining a workpiece such as a crankshaft provides a superior combination of low initial and rebuilding costs, high flexibility in tool changeover and alteration of configuration, yet minimizes floor space and noise level while allowing the combining of several machine operations in a single step. The apparatus also permits the use of optitmum cutting speeds, cutting tool feeds, cutting tool composition and cutting tool dimensional tolerances. The apparatus includes a lathe bed to which the crankshaft is mounted and rotated at a variable rate of speed, as well as an arbor disposed parallel to the axis of rotation of the workpiece, rotatable in the same direction at a variable speed. At least one cutter disk is fixedly mounted to the arbor. The disk has a plurality of cutting tools disposed about part but not all of its circumfery, the tools being located at a generally increasing distance from the center of the disk in a stepwise fashion. The circumfery of the disk also includes a [second] cutout portion between the radially outermost and radially innermost tools. The disk is rotated to bring first the [outermost] *innermost* and then the sequentially more [inner] *outer* tools into contact with the spinning workpiece, in order to machine it. The workpiece and disk are each rotated at programmed, varying rates in order to optimally match the tool feed rate and the workpiece surface linear speed for each machining operation, for example, rough cutting, finish cutting, and dimensioning.

B1 4,790,698

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 6–11:
The present invention relates to devices for machining *the* parts, and more particularly to an apparatus for machining main bearings, crankpins, flanges, cheeks and the like of the crankshaft of an internal combustion engine, or machining any part having a round outside diameter [on] *or* face.

Column 2, lines 10–23:
The apparatus of the present invention comprises a lathe bed and means *for* rotatably mounting the workpiece, preferably a forged, precentered crankshaft, to the bed. The apparatus also includes an arbor disposed parallel to the axis of rotation of the workpiece, rotatable in the same direction as the direction of rotation of the workpiece. At least one substantially planar disk is fixedly mounted on the arbor and rotatable in unison with it. The disk has a plurality of cutting tools disposed about part of its circumfery, the tools being located at a generally increasing distance from the center of the disk in a stepwise fashion. The circumfery of the disk also includes a second cutout portion between the radially outermost and innermost tools.

Column 2, lines 24–33:
In operation, the disk is rotated to bring first the radially innermost tools, and then the sequentially more outer tools, into contact with the same location on the rotating workpiece, in order to machine it. The workpiece and disk are each rotated at programmed, variable rates, in order to optimally match the cutting tool [fed] *feed* rate and the workpiece surface linear speed for each of the tools or groups of tools, for example, rough cutting, finish cutting, or dimensioning tools, depending upon the operations to be performed.

Column 5, lines 34–62:
With reference again to FIG. 1, operation of the apparatus 10 of the present invention for machining the crankshaft 70 can now be readily understood. As disclosed, the apparatus 10 preferably incorporates three cutting disks 32, 34 and 36, corresponding one each to two of the main bearings 72 and the [oil seal diameter] *No. 1 bearing* 73 of the crankshaft 70. Initially, the quills 20 are retracted into the spindle housings 14 so as to allow the steadyrest 27 to support and position the crankshaft 70, the particular workpiece 26 being machined, between the [spindle] *spindles* 22. The quills 20 are then actuated to bring the spindles 22 into abutment with the crankshaft 70, and the chucks 24 actuated to clamp the diameters 90 and 92 on the post end 86 and flange end 88 of the crankshaft 70. In this rest position, the cutout portions 46 of the circumfery 40 of the disk 32, as well as of the disks 34 and 36, are disposed adjacent the crankshaft 70. The crankshaft 70 is then rotated in the direction of the arrow 54 by the spindles 22 and the quills 20. Typically, while varied during operation, the rotational speed of the crankshaft 70 will be about 1000 rpm. Once the crankshaft 70 is up to speed, the arbor 28 is rotated in order to bring the cutting tools 38 on the circumfery of each of the disks 32, 34 and 36 into engagement with the surface of the crankshaft 70, specifically, at each of the two main bearings 72 and [oil seal diameter] *the No. 1 bearing* 73. The tools 38 on each of the disks 32, 34 and 36 are staggered so that only the tools 38 on one of the disks 32, 34 and 36 engage the crankshaft 70 at any given moment.

Column 6, lines 32–49:
The apparatus 10 of the present invention can be used to perform various other machining operations. For example, with particular reference to FIG. 5, the preferred embodiment shown therein can be used to machine the radially outermost edges 98 of the counterweights 80. The crankshaft 70 is [checked] *chucked* on its end [diameter] *diameters* 90 and 92 and rotated so as to present the edges 98 of the counterweights 80 for machining by two staggered pairs of rotatable cutting disks 100 and 102. For clarity, the disks 100 and 102 are shown in FIG. 5 as if they are mounted to different arbors, to show their engagement with all four counterweight edges 98. If the disks 100 and 102 are all mounted to the same arbor, then they would of course be located on the same side of the crankshaft 70; the disks 100, for example, would then be in a position diametrically opposed across the crankshaft 70 as compared to their position shown in FIG. 5.

Column 7, lines 15–36:
Several features characterize each of these embodiments of the present invention. The rotational rates of each of the crankshaft 70 (or other workpiece [16] *26*) and the arbor 28 are varied with respect to one another so as to optimize the match of the feed rate of the tools 38 and the linear surface speed of the portion of the crankshaft 70 being machined, in dependence upon the type of cutting or machining performed by each individual tool 38. In the machining operations described above, upwards of a dozen different types of cutting tools can be employed on each [disks] *disk*, to provide as complete a treatment as possible of the machined portions of the crankshaft 70. It is also preferred in the present invention that, insofar as practicable, the tools 38 includes indexable carbide tool bits of standard, interchangeable configuration. For example, it is preferred that sidewall and diameter finishing tools are mounted in adjustable preset cartridges. In this manner, tool inserts or bits can be readily changed while the arbor and cutters remain [in tact] *intact* on the machine, in contrast to the extensive downtime necessary in the prior art for replacement of the machine tooling.

The drawing figures have been changed as follows: Reference numeral 29 has been added to FIG. 1; outline of workpiece 26 has been changed to phantom lines to FIG. 2.

AS A RESULT OF REEXAMINATION, IT HAS BEEN DETERMINED THAT:

The patentability of claims 6–7 and 10 is confirmed.

Claims 1, 3, 8, 9, 11 and 12 are cancelled.

Claim 2 is determined to be patentable as amended.

Claims 4–5, dependent on an amended claim, are determined to be patentable.

New claims 13–16 are added and determined to be patentable.

2. The invention as defined in claim 1, wherein said means for rotating said arbor comprises means for rotating said arbor at a variable rotational speed during a single [machining operation] *rotation of said arbor.*

*13. The invention according to claim 1, wherein said workpiece rotating means is adapted to rotate said workpiece at a variable rate during a single rotation of said arbor to match the feed rate of each of said tools removing material from said workpiece.*

*14. The invention according to claim 4, wherein said workpiece rotating means is adapted to rotate said workpiece at a variable rate during a single rotation of said arbor to match the feed rate of each of said tools removing material from said workpiece.*

*15. The invention according to claim 8, wherein said plurality of tools on said first-mentioned disk and said associated plurality of tools on said additional disk are staggered, such that at any given moment said workpiece is engaged by a tool on only one of said disks.*

*16. The invention in accordance with claim 12 in which a cutout portion on the disk without cutting tools is rotated to adjacent the workpiece to permit unloading of the workpiece and loading of a new workpiece, the cutting tools being positionend on the disk so that the teeth of lesser radial extent are positioned for cutting without having to rotate the arbor in a reverse direction.*

* * * * *